3,411,887
DIAGNOSTIC COMPOSITION
Edmond Chiu-Choon Ku, Detroit, Mich., assignor to Miles Laboratories, Inc., Elkhart, Ind., a corporation of Indiana
No Drawing. Filed June 15, 1964, Ser. No. 375,298
16 Claims. (Cl. 23—230)

ABSTRACT OF THE DISCLOSURE

A test composition for detecting specific constituents in body fluids such as urine which contain interfering reducing substances such as ascorbic acid, comprising an enzymatic detecting system which releases peroxide and a trapping system for oxidizing the interfering reducing substance, said trapping system comprising an ionizable heavy metal compound which in the ionized state has an oxidation-reduction potential ($E°_{red}$) above that of the interfering substance but below that of the chromogenic subtance.

---

This invention relates to an improved composition and means for the detection and estimation of chemical compounds. More specifically this invention relates to an improved diagnostic composition and means for the detection and estimation of chemical compounds in fluids which contain substances which interfere with the detection and estimation of such compounds.

In any type of routine chemical analysis, it is desirable that the test be simple to perform and at the same time be accurate and reliable under varied testing conditions. Tests which possess such desirable traits are particularly vital to physicians who desire a quick and accurate testing means to confirm a diagnosis. In addition, such diagnostic tests are invaluable in mass screening programs for detecting certain physiological disorders and for follow-up during treatment and control. For example, accurate and reliable diagnostic tests for detecting glucose in body fluids are essential if diabetes is to be detected in afflicted individuals and thereafter controlled.

Although the diagnostic testing devices presently available for the specific detection of sugar in body fluids have contributed greatly to the advancement of the diagnostic art, these devices have specific limitations which restrict their use to body fluids which do not contain interfering substances such as ascorbic acid and methampyrone (pyralgin).

Interfering quantities of ascorbic acid are sometimes found in body fluids of individuals who have been treated with large doses of ascorbic acid (Vitamin C) or with antibiotics containing ascorbic acid as an anti-oxidant. Certain drugs, such as methampyrone, act in a manner similar to ascorbic acid when administered to individuals. These interfering substances are readily excreted by the kidney and are found in high concentrations in urine.

It is therefore an object of this invention to provide an improved diagnostic composition which is capable of a quick and accurate determination and estimation of chemical substances.

A further object of this invention is to provide an improved and reliable diagnostic composition which is capable of detecting and measuring chemical substances in fluids which contain interfering substances.

Another object of this invention is to provide an improved method for the accurate and reproducible measurement of specific chemical substances present in fluid mixtures.

Other objects will be apparent from the disclosure which follows.

These objects may be accomplished and the prior disadvantages overcome by the improved diagnostic composition and technique of this invention. Broadly speaking the composition of this invention comprises a redox-type detecting system and a trapping system which is effective to substantially eliminate the interference otherwise caused by various reducing substances which may be present in the sample being tested. More particularly this novel composition comprises two systems.

A detecting system comprising: (1) an enzymatic-type oxidizing substance which is capable of oxidizing the specific chemical substance being tested for to an oxidized derivative of that chemical substance with the concomitant formation of peroxides;

(2) a chromogenic substance capable of undergoing a color change in the presence of peroxides;

(3) a catalyst to catalyze the above color change; and

A trapping system comprising: (1) a trapping agent capable of removing interfering reducing substances which may be present in the body fluid being tested.

The first essential ingredient in the composition of this invention is an enzymatic-type oxidizing substance such as an aerobic enzyme which is capable of oxidizing a specific chemical substance, in the presence of oxygen, to an oxidized derivative of that chemical substance and peroxides. For example, a specific aerobic enzyme such as glucose oxidase, which is capable of oxidizing glucose to gluconic acid with the concomitant formation of peroxides, is especially effective for detecting and measuring glucose present in body fluids.

In addition to glucose, a variety of other chemical substances such as L-amino acids, D-amino acids, hypoxanthine, xanthine, glycine monoamines, diamines, uric acid, luciferin, D-aspartic acid, aliphatic aldehydes, aromatic aldehydes, lactic acid and numerous others may be similarly detected. Generally each of the above determinations requires a modified detecting system to accomplish the desired oxidation reaction. Other examples of specific detecting systems which may be used in the diagnostic compositions of this invention may be found in the examples which follow.

The second ingredient of this improved diagnostic composition is a chromogenic substance which is capable of undergoing an observable color change in the presence of peroxides. Particularly useful chromogenic substances are redox-type indicator dyes capable of maximum color development within a specific pH range. An especially preferred indicator dye is o-tolidine dihydrochloride. However, other indicator dyes such as aniline and phenol derivatives can be used. For example meta-toluidine, benzidine, guaiacol, 2,7-diaminofluorene, o-dianisidine and the like as well as mixtures thereof may used.

The third component of this improved composition is a catalyst capable of catalyzing the above color formation. Generally, this catalyst is a substance exhibiting peroxidative activity. Suitable organic materials known to have peroxidative activity include hemin, red blood cells and peroxidase to name but a few. Suitable inorganic compounds which may be used to catalyze color formation include compounds such as a mixture of sodium molybdate and potassium iodide. Peroxidase is the preferred catalyst material and may be obtained from horseradish, fig leaves or potatoes.

In addition to the ingredients comprising the diagnostic detecting system as described above, there is required another essential ingredient which is incorporated in the trapping system and which may be called a trapping agent. A trapping agent may be broadly defined as any material which will effectively prevent any interference of a desired enzymatic type reaction by a reducing substance which may be present in the fluid being tested. In general a suitable trapping agent is an ionizable heavy metal compound which, when in an ionized state possesses an oxidation-reduction potential $E°_{red}$ between that of the redox indicator dye contained in the basic diagnostic composition and that of the interfering substance. As a general rule, the oxidation-reduction potentials of the indicator dyes included in the redox-type diagnostic compositions of this invention are substantially above that of the interfering substance which may be present.

If the oxidation-reduction potential of the trapping agent is outside of this range, a completely unsatisfactory diagnostic composition is obtained. For example, if the trapping agent possesses an oxidation-reduction potential above that of the indicator dye contained in the diagnostic composition, an erratic or false color indication is likely to occur. On the other hand, if the trapping agent possesses an oxidation-reduction potential below that of the interfering substance, the interfering substance cannot be effectively removed and false negatives may occur in the results observed.

In addition to the essential requirement that the trapping agent possess an oxidation-reduction potential within a specific range, it is highly advantageous that the trapping agent possess certain other desirable characteristics. These characteristics are set forth below as an aid in selecting the heavy metal ionizable compound which is best suited for a particular redox-type diagnostic composition.

Preferred trapping agents are heavy metal ionizable compounds which possess the greatest number of the following characteristics:

(1) The trapping agent should not alter or modify the reactivities of the active ingredients contained in the testing system;

(2) The trapping agent should not colorize the detecting system or otherwise interfere with the desired color formation;

(3) The trapping agent should be capable of consuming or removing the interfering substances as facilely as possible;

(4) The trapping agent should not inhibit the detecting system nor produce products which may participate in and thus alter the reaction system; and (5) The trapping agent should be as stable as the ingredients which comprise the redox-type detecting system.

Although a great variety of ionizable heavy metal compounds are capable of satisfying some of the characteristics listed above, certain metal ion producing compounds more nearly satisfy all these characteristics. Groups VIII, I-B, II-B and IV-A of the Periodic Table of the Elements are especially preferred. A reproduction of the Periodic Table referred to may be found on pages 448 and 449 of the Handbook of Chemistry and Physics; 42nd Edition, Chemical Rubber Publishing Company; Cleveland, Ohio. This is the conventional Periodic Table in which Group VIII is the Iron Sub-group, Group I-B the Copper Sub-group, Group II-B the Zinc Sub-group and Group IV-A the Carbon Sub-group. These preferred metals therefore include iron, cadmium, cobalt, nickel, tin, lead, copper, mercury, silver, palladium, platinum, gold and the like. Compounds of these metals are generally used individually; however, mixtures of two or more compounds may be used if desired.

These metals may be conveniently incorporated into the basic diagnostic composition as heavy metal salts. Excellent results have been obtained with the water soluble ferric and mercuric salts such as ferric chloride, ferric oxalate, mercuric chloride, mercuric acetate, mercuric nitrate, and the like. Other metal salts which have been found to be especially useful include palladium chloride, platinum chloride and silver nitrate. Of all the metal salts investigated, mercuric acetate and mercuric chloride are preferred. When ferric salts are utilized, it is advantageous to include small amounts of chelating agents such as α,α-dipyridyl or phenanthroline to inhibit possible interference by ferrous ions.

The concentrations of ingredients which comprise the improved diagnostic composition of this invention can be quite varied. For example, in a diagnostic composition for the detection of glucose, the glucose oxidase content can be from 1/10 to 100 times as great as the peroxidase content and still provide a functional testing composition. All that is essentially required is that there be sufficient concentration of catalyst present in catalyze both the oxidation and color formation reactions to completion within a reasonable testing period.

The amount of indicator dye added to the composition of this invention is not particularly critical. Generally the amount which will give a consistent and easily differentiated color change will vary from composition to composition. This desirable minimum amount can be best determined experimentally.

The concentration of trapping agent which is required to effectively trap out interfering substances depends, to a large extent, on the concentration of interfering substance present in the body fluid being tested. As the concentration of interfering substance increases, the concentration of trapping agent should also be proportionately increased.

For most fluids and particularly body fluids usch as urine, the trapping agent may be present in the trapping system in concentrations as high as 15 weight percent. However, concentrations of trapping agent between about 1% to 8% by weight and preferably between about 3% and 5% by weight are most effective for trapping out interfering substances in urine.

Although the choice of ingredients comprising the improved diagnostic composition of this invention is of great importance, it is equally important that the trapping system be combined with the detecting system in a manner which will achieve the specific result desired. It is essential that the trapping system be incorporated in the diagnostic composition in a manner which will permit the trapping agent to contact and remove substantially all the interfering substances which may be present in the fluid being tested before the fluid comes in contact with the testing system of the diagnostic composition. This vital mode of incorporation may be best illustrated when a bibulous substance is used as a carrier for the improved diagnostic composition of this invention. In this illustration, the ingredients are incorporated on a bibulous carrier in two steps. The ingredients which make up the detecting system are first impregnated into a bibulous carrier and dried. The thus impregnated bibulous carrier is then coated with a trapping system solution containing the trapping agent. Suitable bibulous carriers include such materials as wood, paper, cloth, porous plastics and the like.

An excellent diagnostic composition for the detection of glucose in urine, for example, can be obtained by utilizing the above described technique. In this instance a bibulous carrier is first impregnated with a detecting system comprising glucose oxidase, o-tolidine dihydrochloride and peroxidase. After the impregnated carrier has been thoroughly dried, it is then coated with a trapping system composition comprising a solution of mercuric acetate in dimethylsulfoxide and dried.

In formulating the trapping system of this invention it is desirable in many instances to include thickening agents, wetting agents, background dyes, buffers and organic solvents. The addition of such materials is particularly useful if the trapping system is to be deposited on a bibulous carrier. Suitable organic solvents or solvent mixtures include for example, ethanol, ethanol-benzene, dimethylsulfoxide, benzene-dimethylsulfoxide, benzene-ethanol-dimethylsulfoxide, chloroform-dimethylsulfoxide, chloroform-ethanol-dimethylsulfoxide, carbon tetrachloride-dimethylsulfoxide, carbon tetrachloride-ethanol-dimethylsulfoxide, cyclohexane-ethanol-dimethylsulfoxide and the like. Of all the solvents and solvent mixtures investigated, dimethylsulfoxide has been found to be the most effective as a solvent for mercuric salts.

In most enzymatic type reactions, reactivity is affected by variations in the reaction pH. It is essential that the pH of the testing medium be maintained within a range which is optimum for the activity of both the trapping system and the detecting system. Generally a pH of above pH 3 is required. For example, in the determination of glucose, a preferred pH range of between pH 4 and pH 6 is optimum for both the detecting system and the trapping system where the trapping system contains a trapping agent such as mercuric acetate.

This optimal pH environment may be most easily maintained by the use of a buffer. In the preferred embodiment of this invention, sodium acetate is used as the buffer. However, other buffering materials such as citrate, oxalate, salicylate, malate and the like may be used. Certain buffers such as phosphate buffer have been found to have an adverse effect on diagnostic compositions designed for the detection and estimation of L-amino acids. In such instances, other buffering materials should be used.

The concentration of buffer material used is not particularly critical. All that is essentially required is that the buffer effect a pH at the site of reaction optimum for both the detecting and trapping systems. For example, in the determination of glucose, a weight ratio of mercuric acetate to sodium acetate of about 4:1 can achieve this optimum environment. This particular weight ratio will maintain a pH of about 5 and will offset most pH changes which are likely to occur when the trapping system is combined with the detecting system. However, weight ratios of mercuric acetate to sodium acetate as low as 1:1 and as high as 10:1 may be used, if desired.

Thickening agents such as algin, polyvinyl alcohol, starch, gum arabic or a high molecular weight polyethylene glycol may be used, whenever desired, to increase the viscosity of the diagnostic composition. When the test composition is deposited on a bibulous carrier, a more homogeneous application of the test composition can be thereby achieved.

If desired, certain wetting agents may also be added to facilitate rapid and intimate contact between body fluids or other test media and the active ingredients of this invention and to obtain a diffuse color reaction. Commercial wetting agents such as Aerosol OT (bis(2-ethylhexyl)sodium sulfosuccinate), Tween 81 (polyoxyethylene substituted sorbitan mono-oleate), Renex (polyoxyethylene mixed fatty and resin esters and the like) have been found to be extremely useful for such purposes.

The concentration of thickening or wetting agent which can be used in preparing the improved diagnostic composition of this invention will be that amount which can sufficiently increase the viscosity of the diagnostic composition to permit homogeneous application thereof and improve contact of the ingredients of the composition with the fluid being tested without adversely affecting the activity of the composition. Although these concentrations may be quite varied, the most effective concentration can be readily determined experimentally. Although all of the above additives may be conveniently incorporated into the trapping system, all or part of these additives, if desired, may be added to the detecting system.

The diagnostic composition of this invention can be provided in various wet or dry forms other than that of an impregnated bibulous carrier. For example, the active ingredients may be prepared and utilized as a solution or as a powder or in the form of a tablet or pellet which may or may not contain a filler. If desired combinations of either the wet or dry forms can also be employed, other techniques such as depositing a slurry containing the active ingredients on a non-porous substance such as glass, metal and the like can also be used.

The following specific examples are set forth to illustrate the practice of this invention and the relationships important in its use.

EXAMPLE 1

Diagnostic composition for detecting glucose

In preparing this improved diagnostic composition, two mixtures were prepared. The first mixture contained the active ingredients for the detecting system and the second mixture contained the ingredients for the trapping system.

The detecting system contained:
| | |
|---|---|
| Orthotolidine dihydrochloride _____mg__ | 250 |
| Glucose oxidase _____g__ | 1.9 |
| Peroxidase _____mg__ | 40 |
| Gelatin _____g__ | 1.2 |
| F. D. and C. Soluble Red No. 3 _____mg__ | 60 |
| Buffer containing a mixture of 55.5 g. anhydrous citric acid and 244.5 g. trisodium citrate ground together and dissolved in 750 ml of water_ml__ | 30 |

The following sequence was followed in preparing the detecting system. The peroxidase was dissolved in 5 ml. of water and combined with a 5 ml. aqueous suspension of glucose oxidase. The gelatin and F.D. and C. dye were dissolved in 25 ml. of boiling water and cooled to room temperature. The orthotolidine dihydrochloride was then suspended in 12.6 ml. of 2B alcohol and combined with the buffer solution. All of the above mixtures and solutions were combined in one container and thoroughly mixed.

Paper strips measuring 2 inches by ¼ inch were dipped into this prepared solution and air dried at 100° C. for 9 minutes.

The trapping system contained:
| | |
|---|---|
| PVP/VA E535 _____ml__ | 65 |
| GAFAC RE610 (10% in 2B alcohol) ____ml__ | 7 |
| Aerosol OT (25% in 2B alcohol) _____ml__ | 4 |
| Mercuric acetate _____g__ | 80 |
| Sodium acetate _____g__ | 20 |
| Dimethylsulfoxide _____ml__ | 915 |

The mercuric acetate trapping agent was dissolved in dimethylsulfoxide and combined with a solution containing the thickening agent, the wetting agent and the buffer. These ingredients were then thoroughly mixed until a homogeneous solution was obtained. Approximately one-half of the impregnated strips were then coated with the homogeneous mixture comprising the trapping system by dipping the strips into the mixture. The strips were then air dried at a temperature of 80° C. for a period of about 9 minutes.

Three urine solutions, containing varying quantities of glucose and one containing no glucose were prepared. Each of these urine solutions was then divided into 5 equal volumes and varying amounts of ascorbic acid were added to each of sixteen of these solutions. The remaining four urine solutions, which contained only varying quantities of glucose. served as controls. One each of the two types of bibulous testing strips previously prepared were then dipped into the prepared urine solutions by six different testers and their observations recorded in Table I.

TABLE I

| Urine Solution | Percent Glucose | Ascorbic Acid, mg./l. | Diagnostic Composition¹ Containing Trapping Agent | | | | Diagnostic Composition¹ Without Trapping Agent | | | |
|---|---|---|---|---|---|---|---|---|---|---|
| | | | Zero | L | M | D | Zero | L | M | D |
| 1 | 0 | 0 | 6 | | | | 6 | | | |
| 2 | | 200 | 6 | | | | 6 | | | |
| 3 | | 500 | 6 | | | | 6 | | | |
| 4 | | 1,000 | 6 | | | | 6 | | | |
| 5 | | 2,000 | 6 | | | | 6 | | | |
| 6 | 0.1 | 0 | | 5 | 1 | | | 1 | 5 | |
| 7 | | 200 | | 6 | | | 3 | 3 | | |
| 8 | | 500 | | 6 | | | 6 | | | |
| 9 | | 1,000 | | 6 | | | 6 | | | |
| 10 | | 2,000 | | 6 | | | 6 | | | |
| 11 | 0.5 | 0 | | | 4 | 2 | | | | 6 |
| 12 | | 200 | | 2 | 2 | 2 | | 1 | 4 | 1 |
| 13 | | 500 | | 1 | 3 | 2 | 1 | 5 | | |
| 14 | | 1,000 | | 1 | 3 | 2 | 6 | | | |
| 15 | | 2,000 | | 1 | 3 | 2 | 6 | | | |
| 16 | 1.0 | 0 | | | 2 | 4 | | | | 6 |
| 17 | | 200 | | | 2 | 4 | | 1 | 5 | |
| 18 | | 500 | | 1 | 2 | 3 | | 5 | 1 | |
| 19 | | 1,000 | | 1 | 2 | 3 | 6 | | | |
| 20 | | 2,000 | | 1 | 2 | 3 | 6 | | | |

¹ A Zero in the above table indicates no color change while the letters L, M and D represent light, medium and dark color development respectively.

In the test solution where no glucose or ascorbic acid was present (Solution 1) all twelve testing strips retained their original color and the testers recorded a zero reading. With a solution containing 1.0% of glucose and 1,000 mg./l. of ascorbic acid (Solution 19), all six testers recorded a zero with diagnostic strips which did not contain a trapping agent. On the other hand, the six testers recorded 1 light, 2 medium and 3 dark with diagnostic strips containing a trapping agent. These results may be compared with the test results from (Solution 11). This urine solution contained 0.5 g. percent of glucose and no ascorbic acid. The testers recorded 4 medium and 2 dark readings with this urine solution and 6 dark without trapping agent. Diagnostic compositions which were not coated with a trapping agent thus gave erratic readings, particularly as the glucose concentration was increased.

Table I shows the deleterious effect ascorbic acid has on glucose determinations and how this effect is overcome by the new and improved composition of this invention.

EXAMPLE II

A diagnostic composition for the detection of L-amino acids was prepared by combining L-amino acid oxidase with a mixture of orthotolidine dihydrochloride, peroxidase and a citrate buffer to maintain a pH of above 3. This composition was impregnated into a bibulous carrier and then coated with a silver nitrate trapping system, according to the technique described in Example I. When the impregnated and coated paper strip was moistened with a test solution containing approximately 0.5% L-amino acids and about 500 mg./l. of ascorbic acid, a purple-blue color developed. Other prepared strips which were not coated with a silver nitrate trapping system gave erratic, if any, color changes when contacted with the test solution.

EXAMPLE III

A diagnostic composition for the detection of D-amino acids was prepared by combining D-amino acid oxidase with a mixture of orthotolidine dihydrochloride, peroxidase and an oxalate buffer to maintain a pH of above 3. This composition was impregnated into a bibulous carrier and then coated with a palladium chloride trapping system according to the technique described in Example I. When the impregnated and coated paper strip was moistened with a test solution containing approximately 0.5% D-amino acid and about 500 mg./l. of ascorbic acid, a purple-blue color developed. Other prepared strips which were not coated with a palladium chloride trapping system gave erratic, if any, color changes when contacted with the test solution.

EXAMPLE IV

A diagnostic composition for the detection of xanthine was prepared by combining xanthine oxidase with a mixture of orthotolidine dihydrochloride, peroxidase and a citrate buffer to maintain a pH of about 3. This composition was then impregnated into a bibulous carrier and then coated with a ferric chloride trapping system according to the technique described in Example I. When this improved diagnostic composition was moistened with a test solution containing approximately 1.0% xanthine and about 500 mg./l. of ascorbic acid, a purple-blue color developed. Other prepared strips which were not coated with a ferric chloride trapping system gave erratic, if any, color changes when contacted with the test solution.

EXAMPLE V

A diagnostic composition for the detection of glycine was prepared by combining glycine oxidase with a mixture of orthotolidine dihydrochloride, peroxidase and a citrate buffer to maintain a pH of above 3. This composition was impregnated into a bibulous carrier and then coated with a ferric oxalate trapping system, according to the technique described in Example I. When the impregnated and coated paper strip was moistened with a test solution containing approximately 1.0% by weight of glycine and about 500 mg./l. of ascorbic acid, a purple-blue color developed. Other prepared strips which were not coated with a ferric oxalate trapping system gave erratic, if any, color changes when contacted with the test solution.

EXAMPLE VI

A diagnostic composition for the detection of monoamines was prepared by combining monoamine oxidase with a mixture of orthotolidine dihydrochloride, peroxidase and a citrate buffer to maintain a pH of about 3. This composition was impregnated into a bibulous carrier and then coated with a mercuric chloride trapping system according to the technique described in Example I. When the impregnated and coated paper strip was moistened with a test solution containing approximately 0.1% monoamines and about 500 mg./l. of ascorbic acid, a purple-blue color developed. Other prepared strips which were not coated with a mercuric chloride trapping system gave erratic, if any, color changes when contacted with the test solution.

EXAMPLE VII

A diagnostic composition for the detection of diamines was prepared by combining diamine oxidase with a mixture of orthotolidine dihydrochloride, peroxidase and an oxalate buffer to maintain a pH of above 3. This composition was impregnated into a bibulous carrier and then coated with a mercuric nitrate trapping system according to the technique described in Example I. When the impregnated and coated paper strip was moistened with a test solution containing approximately 0.5% diamines and about 500 mg./l. of ascorbic acid, purple-blue color developed. Other prepared strips which were not coated with a mercuric nitrate trapping system gave erratic, if any, color changes when contacted with the test solution.

EXAMPLE VIII

A diagnostic composition for the detection of uric acid was prepared by combining uricase with a mixture of orthotolidine dihydrochloride, peroxidase and a citrate buffer to maintain a pH of about 3. This composition was impregnated into a bibulous carrier and then coated with a platinum chloride trapping system according to the technique described in Example I. When the impregnated and coated paper strip was moistened with a test solution containing approximately 0.1% uric acid and about 500 mg./l. of ascorbic acid, a purple-blue color developed. Other prepared strips which were not coated with a platinum chloride trapping system gave erratic, if any, color changes when contacted with the test solution.

EXAMPLE IX

A diagnostic composition for the detection of luciferin was prepared by combining luciferase with a mixture of orthotolidine dihydrochloride, peroxidase and a phosphate buffer to maintain a pH of about 3. This composition was impregnated into a bibulous carrier and then coated with a cobalt acetate trapping system according to the technique described in Example I. When the impregnated and coated paper strip was moistened with a test solution containing approximately 0.5% luciferin and about 500 mg./l. of ascorbic acid, a purple-blue color developed. Other prepared strips which were not coated with a cobalt nitrate trapping system gave erratic, if any, color changes when contacted with the test solution.

EXAMPLE X

A diagnostic composition for the detection of D-aspartic acid was prepared by combining D-aspartic acid oxidase with a mixture of orthotolidine dihydrochloride, peroxidase and a citrate buffer to maintain a pH of above 3. This composition was impregnated into a bibulous carrier and then coated with a cupric chloride trapping system according to the technique described in Example I. When the impregnated and coated paper strip was moistened with a test solution containing approximately 0.5% D-aspartic acid and about 500 mg./l. of ascorbic acid, a purple-blue color developed. Other prepared strips which were not coated with cupric chloride trapping system gave erratic, if any, color changes when contacted with the test solution.

EXAMPLE XI

A diagnostic composition for the detection of various aliphatic or aromatic aldehydes was prepared by combining liver aldehyde oxidase prepared from mammalian liver with a mixture of orthotolidine dihydrochloride, peroxidase and a phosphate buffer to maintain a pH of above 3. This composition was impregnated into a bibulous carrier and then coated with a stannic chloride trapping system according to the technique described in Example I. When the impregnated and coated paper strip was moistened with a test solution containing approximately a 0.5% mixture of acetaldehyde, butyraldehyde and benzaldehyde and about 500 mg./l. of ascorbic acid, a purple-blue color developed. Other prepared strips which were not coated with a stannic chloride trapping system gave erratic, if any, color changes when contacted with the test solution.

In summary, this invention provides a diagnostic composition consisting of a redox-type detecting system and a trapping system. The detecting system is capable of determining and measuring a chemical substance in a body fluid which contains an interfering reducing substance by oxidizing the chemical substance to an oxidized derivative of that substance and peroxides. The peroxides are detected by means of a chromogenic detecting system which exhibits a varying color change in the presence of varying amounts of peroxides. The trapping system consists of an ionizable heavy metal compound which is capable of removing substantially all interfering substances which may be present in the body fluid before the interfering substance can come in contact with the detecting system. This prevents the interfering substance from interfering and thereby hindering an accurate determination of the chemical substance.

What is claimed is:

1. A composition for the detection of a specific chemical substance in a testing fluid containing an interfering reducing substance having an oxidation-reduction potential about equal to that of ascorbic acid which composition comprises a detecting system comprising:
   (a) an enzymatic type oxidizing substance capable of oxidizing the said specific chemical substance in the presence of oxygen to an oxidized derivative of that substance and peroxide,
   (b) a chromogenic substance capable of a color change in the presence of peroxide,
   (c) a peroxidative type catalyst for catalyzing said color change, and a trapping system comprising
      an ionizable heavy metal compound which in an ionized state, possesses an oxidation-reduction potential below that of the chromogenic substance and above that of the interfering substance present in the testing fluid.

2. The composition of claim 1 wherein the ionizable heavy metal compound contains a metal selected from the group consisting of Groups VIII, I-B, II-B and IV-A of the Periodic Table of the Elements.

3. The composition of claim 1 wherein the ionizable heavy metal compound is selected from the group consisting of ferric chloride, ferric oxalate, mercuric chloride, mercuric acetate, mercuric nitrate, palladium chloride, platinum chloride, silver nitrate, cobalt acetate, cupric chloride and stannic chloride.

4. The composition of claim 1 wherein the ionizable heavy metal compound is a mercuric salt.

5. The composition of claim 1 wherein the ionizable heavy metal compound is mercuric chloride.

6. The composition of claim 1 wherein the ionizable heavy metal compound is mercuric acetate.

7. The composition of claim 1 wherein the testing fluid is urine and the interfering reducing substance is ascorbic acid.

8. The composition of claim 1 wherein the detecting system and trapping system are incorporated with a bibulous carrier.

9. The composition of claim 1 wherein the detecting system is impregnated into a bibulous carrier and the trapping system is coated thereon.

10. A method for detecting a chemical substance in a testing fluid containing an interfering reducing substance having an oxidation-reduction potential about equal to that of ascorbic acid which comprises contacting said fluid with a redox-type detecting system which has incorporated therein a trapping system, said redox-type detecting system comprising:
   (a) an enzymatic type oxidizing substance capable of oxidizing the said specific chemical substance in the presence of oxygen to an oxidized derivative of that substance and peroxides,
   (b) a chromogenic substance capable of detecting the peroxide produced, and
   (c) a peroxidative type catalyst for catalyzing said chromogenic detection; and, said trapping system comprising
    an ionizable heavy metal compound which in an ionized state, possesses an oxidation-reduction potential below that of the chromogenic substance and above that of the interfering substance, and
is capable of removing substantially all the interfering substance from the body fluid before the body fluid comes in contact with the redox-type detecting system.

11. The method of claim 10 wherein the ionizable heavy metal compound contains a metal selected from the group consisting of Groups VIII, I–B, II–B and IV–A of the periodic Table of the Elements.

12. The method of claim 10 wherein the ionizable heavy metal compound is selected from the group consisting of ferric chloride, ferric oxalate, mercuric chloride, mercuric acetate, mercuric nitrate, palladium chloride, platinum chloride, silver nitrate, cobalt acetate, cupric chloride and stannic chloride.

13. The method of claim 10 wherein the ionizable heavy metal compound is a mercuric salt.

14. The method of claim 10 wherein the testing fluid is urine and the interfering reducing substance is ascorbic acid.

15. The method of claim 10 wherein the detecting system and trapping system are incorporated with a bibulous carrier.

16. The method of claim 10 wherein the detecting system is impregnated into a bibulous carrier and the trapping system is coated thereon.

References Cited

UNITED STATES PATENTS

| | | | |
|---|---|---|---|
| 2,799,660 | 7/1957 | Nichols et al. | 23—230 XR |
| 2,850,359 | 9/1958 | Worthington et al. | 23—230 |
| 3,104,209 | 9/1963 | Scott | 23—253 XR |
| 3,235,337 | 2/1966 | Artis | 23—253 |
| 3,266,868 | 8/1966 | Harvill | 23—230 XR |

OTHER REFERENCES

Martell et al., "Chemistry of the Metal Chelate Compounds," pp. 405 and 458, printed 1952, QD–411–M38 C.5.

MORRIS O. WOLK, *Primary Examiner.*

R. E. SERWIN, *Assistant Examiner.*